United States Patent
Schmider

(10) Patent No.: US 6,232,690 B1
(45) Date of Patent: May 15, 2001

(54) ELECTRONICALLY COMMUTATED DC

(75) Inventor: Fritz Schmider, Hornberg (DE)

(73) Assignee: Papst-Motoren GmbH & Co. KG (DE)

( * ) Notice: Subject to any disclaimer, the term of this patent is extended or adjusted under 35 U.S.C. 154(b) by 0 days.

(21) Appl. No.: 09/380,789

(22) PCT Filed: Feb. 25, 1998

(86) PCT No.: PCT/EP98/01058

§ 371 Date: Sep. 3, 1999

§ 102(e) Date: Sep. 3, 1999

(87) PCT Pub. No.: WO98/39836

PCT Pub. Date: Sep. 11, 1998

(30) Foreign Application Priority Data

Mar. 4, 1997 (DE) .......................................... 297 03 862 U

(51) Int. Cl.[7] .................................................. H02K 16/02
(52) U.S. Cl. .......................... 310/156; 310/114; 310/112; 310/90; 310/268; 310/254; 310/91
(58) Field of Search ................... 310/156, 114, 310/112, 113, 268, 254, 194, 67 R, 63, 90, 91

(56) References Cited

U.S. PATENT DOCUMENTS

| | | | |
|---|---|---|---|
| 3,526,795 | * 9/1970 | Pecs | 310/114 |
| 4,644,207 | * 2/1987 | Catterfeld et al. | 310/126 |
| 5,245,238 | 9/1993 | Lynch et al. | 310/116 |

FOREIGN PATENT DOCUMENTS

| | | | |
|---|---|---|---|
| 436 550 | 11/1967 | (CH) | F04D/10/01 |
| 22 60 069 | 6/1974 | (DE) | H02K/29/06 |
| Gm 76 01 853 | 5/1976 | (DE) . | |
| 40 42 432 | 8/1993 | (DE) | H02K/29/00 |
| 44 21 855 | 1/1996 | (DE) | B60H/1/00 |
| 0 548 362 | 9/1997 | (EP) | H02K/29/00 |
| 0 814 269 | 12/1997 | (EP) | F04D/25/06 |
| WO 97/47068 | 12/1997 | (EP) | H02K/16/00 |
| 53-126110 | * 11/1978 | (JP) | H02K/16/02 |
| 55-63493 | 1/1982 | (JP) | H02K/21/24 |

OTHER PUBLICATIONS

Patent Abstracts of Japan JP 59 172961 Sep. 29, 1984.

* cited by examiner

*Primary Examiner*—Burton Mullins
(74) *Attorney, Agent, or Firm*—Robert W. Becker & Associates

(57) ABSTRACT

A DC motor has a housing having an air gap and a stator coil is positioned in the air gap. First and second permanent magnet rotors are coaxially arranged to one another in the housing on opposite sides of the air gap. The first and second permanent magnet rotors are mounted in the housing without being mechanically connected to one another. In another embodiment, a flat stator coil is provided. At least one permanent magnet rotor has an axially magnetized annular rotor magnet, a plastic part as a support for the rotor magnet, a shaft mounted in the plastic part, and a soft magnetic ground element snapped into the plastic part. The rotor magnet is fastened to the soft magnetic ground element. In another embodiment, a housing having first and second cup-shaped housing parts is provided. The first housing part has a first bottom and the second housing part has a second bottom. The first and second bottoms form an air gap therebetween. A flat stator coil is positioned in the air gap. In yet another embodiment, a stator support with an air gap is provided. A stator coil is wound onto the stator support within the air gap and an axle is mounted centrally thereon. First and second permanent magnet rotors are coaxially arranged on opposite sides of the air gap. The first and second permanent magnet rotors are mounted without being mechanically connected to one another.

18 Claims, 2 Drawing Sheets

ELECTRONICALLY COMMUTATED DC

BACKGROUND OF THE INVENTION

The invention relates to an electronically commutated DC motor having an air gap in which a stator coil is arranged and having a first permanent magnet rotor arranged on one side of this air gap. A second permanent magnetic rotor is positioned at the opposite side of the air gap, whereby the second rotor is coaxially arranged to the first rotor without a mechanical connection to the first rotor.

From DE 195 03 521 A1 an electronically commutated drive motor with planar air gap having a fan wheel connected to the rotor is known. Such motors are relatively inexpensive because of their simple construction and are therefore used, among other applications, also in the interior of motor vehicles. However, a certain noise level may not be surpassed in these situations. It is therefore important that the rotor of the fan wheel will not begin to vibrate as a result of the occurring driving accelerations but remains secured within its guide bearing. The required axial force is provided by magnetic coupling between the rotor magnet and the steel disk positioned within the stator. A disadvantage is that eddy currents will result which decrease the efficiency of the motor and indirectly increase the running noise level. A further disadvantage of such disk rotor motors is that, in general, electromagnetically caused axial reaction forces result which may cause the entire system to vibrate.

It is an object of the invention to provide an electric motor of the aforementioned kind which has an even more reduced noise level at acceptable costs.

SUMMARY OF THE INVENTION

Inventively, the DC motor has a housing having an air gap and a stator coil is positioned in the air gap. A first permanent magnet rotor and a second permanent magnet rotor are coaxially arranged to one another in the housing on opposite sides of the air gap. The first and second permanent magnet rotors are mounted in the housing without being mechanically connected to one another.

In another embodiment, a flat stator coil is provided. At least one permanent magnet rotor comprises an axially magnetized annular rotor magnet, a plastic part as a support for the rotor magnet, a shaft mounted in the plastic part, and a soft magnetic ground element mounted by a snap connection on the plastic part. The rotor magnet is fastened to the soft magnetic ground element.

In another embodiment, a housing having a first cup-shaped housing part and a second cup-shaped housing part, is provided. The first housing part has a first bottom and the second housing part has a second bottom. The first and second bottoms face one another and are spaced from one another to form an air gap. A flat stator coil is positioned in the air gap.

In yet another embodiment, a stator support with an air gap is provided A stator coil is wound onto the stator support within the air gap. An axle is mounted centrally in the stator support. A first permanent magnet rotor and a second permanent magnet rotor are coaxially arranged to one another on opposite sides of the air gap. The first and second permanent magnet rotors are mounted without being mechanically connected to one another.

BRIEF DESCRIPTION OF THE DRAWINGS

It is shown in.

DESCRIPTION OF PREFERRED EMBODIMENTS

Figure 1:
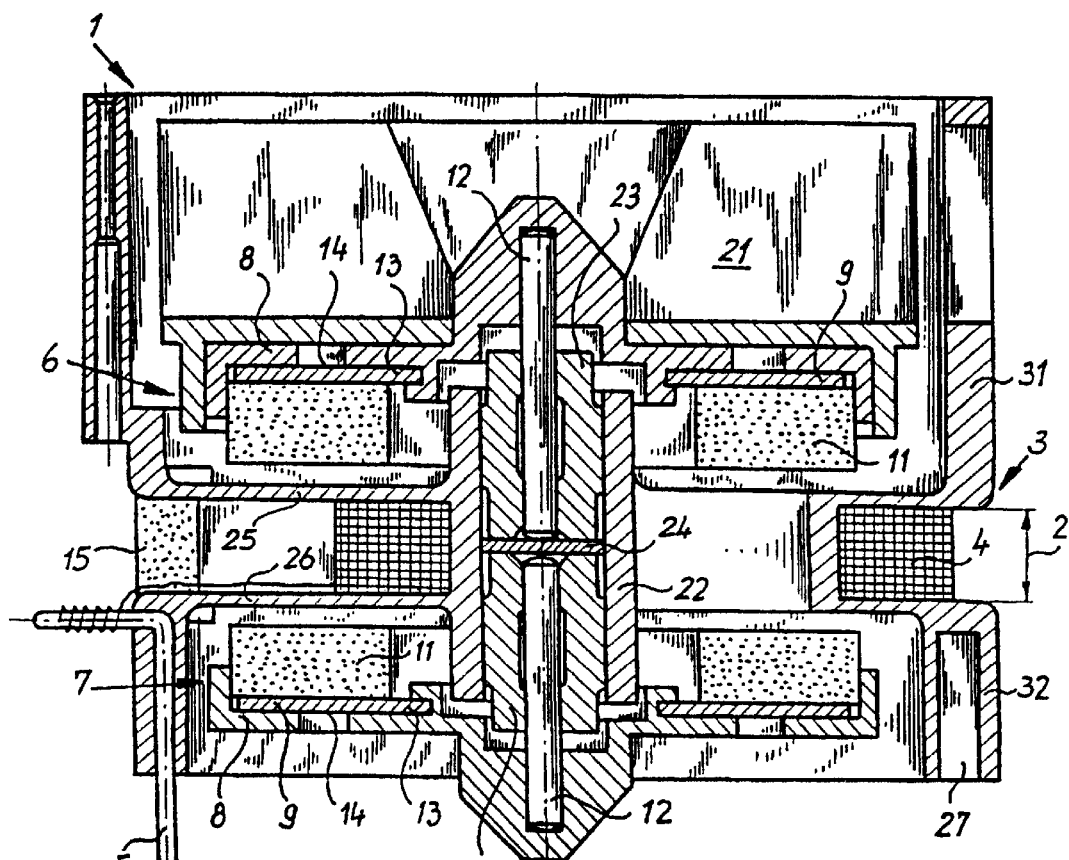
FIG. 1 a first embodiment of the inventive DC motor in section.

FIG. 1 shows the inventive DC motor which is arranged in the housing 1. A stator support 3 comprising a support tube 22 is connected to the housing 1. The stator support 3 extends through the air gap 2, indicated by the double arrow of the motor, and provides substantially parallel walls 25, 26 between which the stator coil 4 is arranged. On one side of the air gap 2 a first permanent magnet rotor 6 and at the opposite side of the air gap 2 a second permanent magnet rotor 7 are arranged whereby the second rotor is mounted coaxially to the first rotor 6 but without mechanical connection to the first rotor 6. In this embodiment, only the first rotor 6 serves as a drive for a load, for example, a fan wheel 21 connected to the rotor. Depending on the respective needs, it is also possible to employ the second freely rotating rotor for driving a further load. The fan wheel 21 is surrounded by a first wall 31 of the housing 1 that, in the area of the fan wheel 21, is adapted to supply air to the fan wheel. The second wall 32 surrounds the periphery of the second rotor 7. The two rotors 6, 7 are mechanically substantially identical and their permanent magnets 11 are substantially identically magnetized. In the support tube 22 a respective radial bearing arrangement 23 for radially supporting the shafts 12 of the two rotors 6, 7 is provided. Between the two radial bearings 23 an axial bearing element 24, preferably a plastic disk, is arranged. The free end of the shaft 12 of one rotor rests at one side of the plastic disk and the free end of the shaft 12 of the other rotor 7 rests on the other side of the plastic disk. The rotors 6, 7 are pulled together by reciprocate magnetic attraction.

Between the walls 25, 26 a stationary, axially polarized positioning magnet 15 is arranged which in cooperation with the permanent magnets 11 of the rotors 6, 7 affects the position of the two rotors when the motor is not supplied with current (for example, starting position).

The rotors 6, 7 are comprised of a plastic part 8 which is a support for the annular, axially magnetized rotor magnets 11. One end of the shaft 12 of the rotor is mounted in this part 8 and a magnetic ground element 9 of soft magnetic properties is fastened thereat by a snap connection, with the rotor magnet 11 of an annular design being fastened thereto, for example, by an adhesive. The magnetic ground element 9, which is embodied as an annular disk, is snapped with its inner edge into a correspondingly embodied radial annular groove 13 of the plastic part 8 which is preferably produced as an injection molded part. The magnetic ground element 9 rests on the bottom surface 14 of the plastic part 8.

Figure 2:
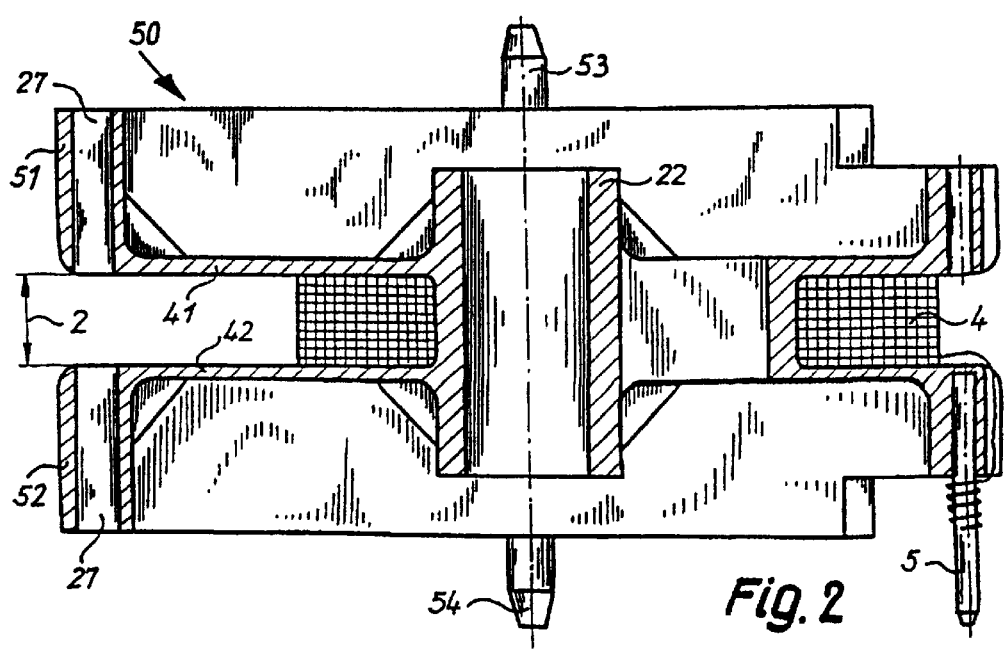
FIG. 2 a second embodiment with a housing variation.

In FIG. 2, a further embodiment is shown, especially a further example of a housing 15 of the inventive motor. The other design features of the motor (rotor and stator) correspond to that of the motor according to FIG. 1 and are therefore not shown. This housing 50 has two substantially identical cup-shaped housing parts 51, 52 which open in opposite directions and are positioned facing one another with their bottom portions 41, 42, thus forming a gap for receiving a stator coil 4 (flat coil) that provides the air gap 2 for the motor. The housing 50 can be universally mounted.

The housing parts 51, 52 are connected to one another by the bearing tube 22. The portion of the outer part of the bearing tube 22 extending through the air gap 2 is embodied as a coil shaping member for the flat coil 4.

As shown in the embodiment of FIG. 1, the radial bearing arrangements 23 (not represented) can be embodied as sinter bearings and can be fastened by pressing them into the support tube 22. The axial bearing 24 (not represented), positioned between the pressed-in sinter bearings 23, acts in the direction of the oppositely arranged sinter bearings 23 as an axial bearing, in the same manner as disclosed in embodiment FIG. 1.

The flat coil 4 has a shape deviating from a circular shape and is double-stranded, especially bifilar.

The completely assembled motor can be fastened by screws, which are threaded into the fastening bores 27, to a wall or to a circuit board. For facilitating assembly, positioning pins 53, 54 are provided which can be placed into corresponding holes so that the motor to be mounted can thus be fixed in its position.

Contact pins 5 can be placed into the injection mold for molding the housing 1, 50 in order to be embedded. Before placement into the mold, the ends of the coil 4 are connected to the contact pins 5 by soldering.

Figure 3:
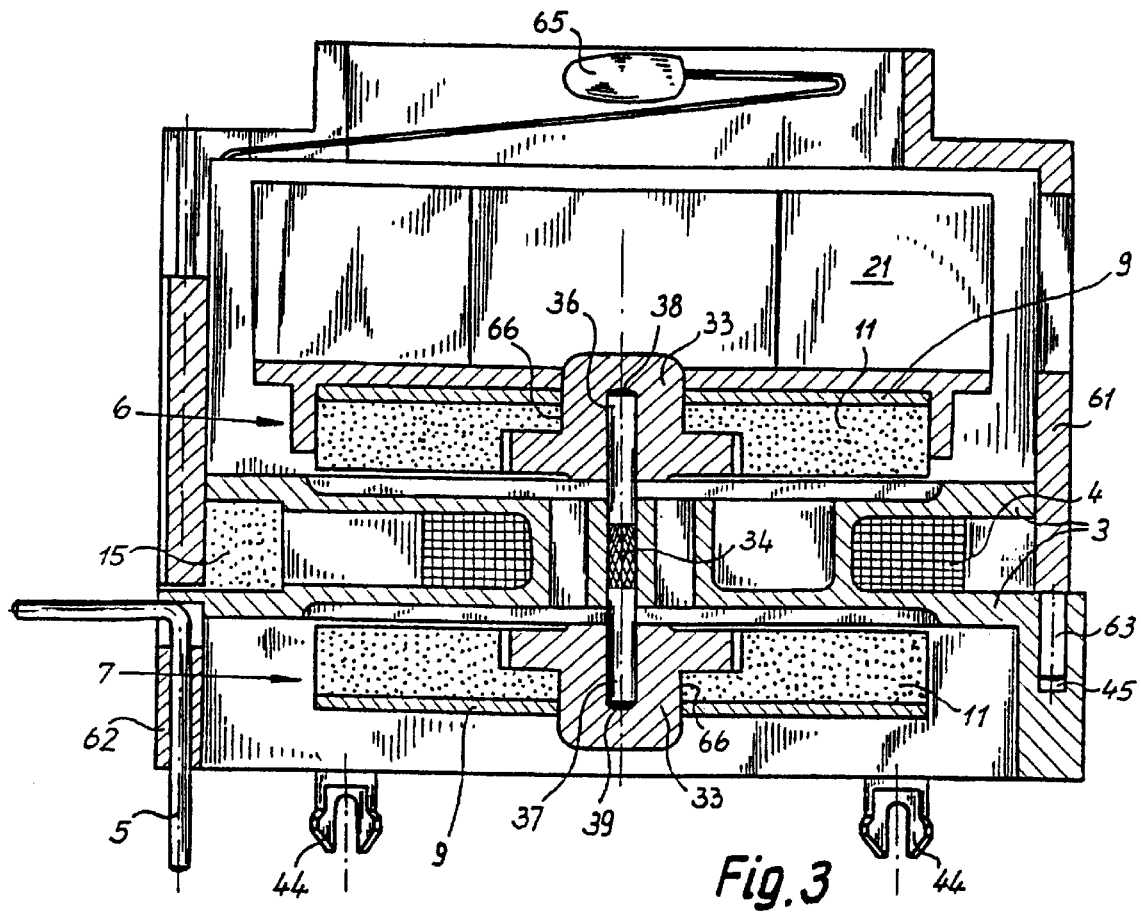
FIG. 3 a third embodiment.

FIG. 3 shows a simplified embodiment in comparison to the embodiment of FIG. 1. The parts of the stators and rotors are substantially identical and are therefore indicated with the same reference numerals. The two rotors 6, 7 comprise magnetic ground elements 9 which rest on the magnets 11.

The fan wheel 21 is, for example, directly connected to the upper rotor 6 and, for example, is connected to the rotor 6 by press fitting. For supporting the rotors 6, 7, a bearing bushing 33 is respectively provided with a hub-shaped projection 66 that is positioned centrally within the rotor. An axle 34 is fastened to the stator support 3. The diameter of the bores in the bearing bushing 33 is such that it facilitates easy running of the attached rotor 6, 7 on the end portion 36, 37 of the axle 34. The reciprocating attraction of the two rotor magnets 11, as disclosed in connection with FIGS. 1 and 2, results in the tops 38, 39 of the end portions of the axle 34 being pulled against the bottom surfaces of the bores of the bearing bushing 33. The rotors 6 and 7 are comprised in this embodiment of identical parts: molded magnet 11, bearing bushing 33 molded of a plastic material with gliding properties, and stamped magnetic ground disk 9. Only the fan wheel 21 comprised of plastic must be glued onto the rotor 6 or connected by a snap connection. The two opposed rotors 6, 7 in this embodiment are magnetized with four poles. The magnets 11 attract one another so that an axial magnetic clamping without bearing play results. The axial support is realized at the tops 38, 39 of the axle 34. The magnets 11 and the magnetic ground disks 9 are also secured by magnetic force so that complicated fastening steps are eliminated. The bearing bushings of special plastic material are suitable also for dry running, i.e., a lubricant must not be employed.

The electromagnetic excitation of both rotors 6, 7 as well as the reaction forces of the position signals on the stator are compensated by the inventive arrangement. The sound transmission through the body onto the entire system is thus considerably reduced and the iron losses are also eliminated.

The very simple design and the use of identical parts result in a substantial price reduction.

The stator support 3 is a securing means for the coil 4 and the support for one or more positioning magnets 15 and is provided with snap hooks 44, preferably molded thereto, for attachment to a printed circuit board (done by the customer) and receiving bores 45 for the motor housing 61. With guides (for example, dovetail guides) at the outer contour of the support 3 a contact support 62 with contact pins 5 is inserted from above or below. The support 62 is required for the purpose of automatically winding the stator for contacting the circuit board (done by the customer). The motor housing is connected by pins 63 to the support 3 and can also contain a temperature sensor 65.

Figure 4:
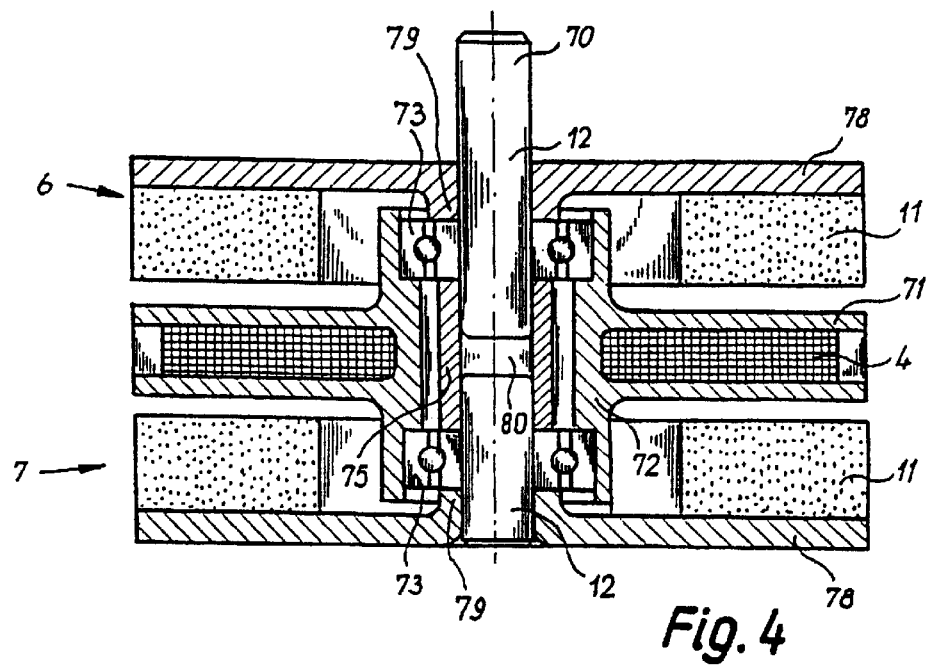
FIG. 4 a fourth embodiment.

FIG. 4 shows an embodiment of the invention with roller bearings. The support disks 78, at which the magnets 11 of the rotors 6, 7 are fastened, are embodied as stamped sheet metal disks and provide also magnetic grounding. A stator support 71 is a holder for the coil 4 and for the non-represented positioning magnets; it also serves as a motor attachment. The support disks 78 comprise a central bore and a collar-shaped projection 79 produced by stamping and deep drawing. At the stator support a support tube 72 is injection molded substantially in a central position which receives at is axial end portions bearings 73. These bearings 73, preferably roller bearings, provide the support action for the two rotor shafts 12 which are fixedly connected respectively to the support disks 78 of the rotors 6, 7.

Because of the reciprocate magnetic attraction of the two rotor magnets 11, the projections 79 of the support disks 78 are pulled in the axial direction against the inner rings of the bearings 73 so that bearing play is eliminated and bearing noise is reduced.

Between the shaft ends of the shaft 12 an intermediate space 80 is provided. The shaft ends are inserted with slidingly seated into the spacer bushing 75. The bushing 75 is not a follower connection of the two shaft ends but ensures only the axial spacing of the bearings 73 and guiding of the shafts 12. The shaft 12 of the upper rotor 6 has an axial extension 70 for receiving a load, for example, a fan wheel 21. The connectors of the coil ends can be connected as disclosed above.

Outer and inner diameters of the bearings 73 are slidingly seated such that a highly precise and expensive manufacturing tolerance is not needed. The support disks 78 must only be fixedly connected to the shafts 12.

The invention is not limited to the disclosed and represented embodiments, but encompasses also all embodiments which function in the same manner as the invention.

The present invention is, of course, in no way restricted to the specific disclosure of the specification and drawings, but also encompasses any modifications within the scope of the appended claims.

What is claimed is:

1. An electronically commutated dc motor comprising:
   a housing (1) having an air gap (2);
   a stator coil (4) positioned in said air gap (2);
   a first permanent magnet rotor (6) and a second permanent magnet rotor (7) coaxially arranged to one another in said housing (1) on opposite sides of said air gap (2);
   said first and second permanent magnet rotors (6, 7) mounted in said housing (1) and magnetically linked to one another by reciprocate magnetic attraction.

2. A motor according to claim 1, wherein one of said first and second permanent magnet rotors (6, 7) is adapted to drive a load.

3. A motor according to claim 1, wherein said first and second permanent magnet rotors (6, 7) are identical.

4. A motor according to claim 1, wherein said first and second permanent magnet rotors (6, 7) have identical magnetization.

5. A motor according to claim 1, further comprising:
   a first radial bearing (23, 73) supporting said first permanent magnet rotor (6);

a second radial bearing (23, 73) supporting said second permanent rotor (7);

a support tube (22, 72) in which said first and second radial bearings (23, 73) are mounted.

6. A motor according to claim 5, further comprising an axial bearing element (24) positioned between said first and second radial bearings (23), wherein said first permanent magnet rotor (6) has a first shaft (12) and said second permanent magnet rotor (7) has a second shaft (12), wherein a free end of said first shaft (12) and a free end of said second shaft (12) rest at opposed sides of said axial bearing element (24), wherein said first permanent magnet rotor (6) and said second permanent magnet rotor (7) magnetically attract one another so as to be pulled against and secured at said axial bearing element (24).

7. A motor according to claim 5, further comprising a stator support (3) supporting said stator coil (4), wherein said support tube (22) is connected to said stator support (3), wherein said stator support (3) extends through said air gap (2) and has two parallel walls (25, 26) extending parallel to said air gap (2), and wherein said stator coil (4) is positioned between said parallel walls (25, 26).

8. A motor according to claim 7, further comprising at least one stationary positioning magnet (15) mounted between said parallel walls (25, 26) affecting a rest position of said first and second permanent magnet rotors (6, 7), when said motor is not supplied with current.

9. A motor according to claim 8, wherein said at least one stationary positioning magnet (15) is axially polarized.

10. A motor according to claim 5, wherein said first and second radial bearings are roller bearings (73) slidingly seated inside opposed end portions of said support tube (72) and wherein said first and second permanent magnet rotors (6, 7) each comprises a shaft (12) received respectively in one of in said roller bearings (73).

11. A motor according to claim 10, further comprising a spacer bushing (75) positioned between said first and second roller bearings (73), wherein said spacer bushing (75) has an inner diameter that is greater than an outer diameter of said shafts (12) and wherein between facing ends of said shafts (12) a free space (80) is provided.

12. A motor according to claim 10, wherein said first and second permanent magnet rotors (6, 7) each comprise a support plate (78) and a permanent magnet (11) fastened to said support plate (78), and wherein said shafts (12) are connected to a respective one of said support plates (78).

13. A motor according to claim 12, wherein said support plates (78) are stamped parts comprising of a magnetically conducting material and have a central opening with a deep-drawn collar (79).

14. A motor according to claim 1, wherein said housing (1) comprises:

a support tube (22) supporting said first and second permanent magnet rotors (6, 7);

a first outer wall (31) surrounding said first permanent magnet rotor (6); and a second outer wall (32) surrounding said second permanent magnet rotor (7).

15. A motor according to claim 14, wherein said first permanent magnet rotor (6) drives a fan wheel (21) and wherein said first outer wall (31) is adapted to guide air moved by the fan wheel (21).

16. An electronically commutated dc motor comprising:

a stator support (3) providing an air gap (2);

a stator coil (4) wound onto said stator support (3) within said air gap (2);

an axle (34) mounted centrally in said stator support (3);

a first permanent magnet rotor (6) and a second permanent magnet rotor (7) coaxially arranged to one another on opposite sides of said air gap (2);

said first and second permanent magnet rotors (6, 7) mounted to be magnetically linked to one another by reciprocate magnetic attraction.

17. A motor according to claim 16, wherein said first and second permanent magnet rotors (6, 7) are identical and each comprise a permanent magnet (11), a magnetic ground element (9), and a bearing bushing (33), wherein bearing bushing (33) has a hub member (66) and wherein said permanent magnet (11) and said magnetic ground element (9) are positioned on said hub member (66).

18. A motor according to claim 17, wherein each said bearing bushing (33) has a receiving bore in which opposed end portions (36, 37) of said axle (34) are mounted, wherein each said receiving bore has a diameter that is slightly greater than a diameter of said end portions (36, 37) and wherein end faces of said end portions (36, 37) are pulled against bottom surfaces of receiving bores by magnetic force of said first and second permanent magnet rotors (6, 7).

* * * * *